No. 764,986.

Patented July 12, 1904.

UNITED STATES PATENT OFFICE.

FRANCIS J. BULASK, OF TOLEDO, OHIO.

ARTIFICIAL FUEL.

SPECIFICATION forming part of Letters Patent No. 764,986, dated July 12, 1904.

Application filed March 12, 1903. Serial No. 147,514. (No specimens.)

*To all whom it may concern:*

Be it known that I, FRANCIS J. BULASK, a citizen of the United States, residing at Toledo, in the county of Lucas and State of Ohio, have invented certain new and useful Improvements in Artificial Fuel, of which the following is a specification.

This invention appertains to artificial fuel placed upon the market in lump form, the purpose being to provide an insoluble briquet which will burn freely with an intense heat and not clinker or disintegrate.

The combustible material is preferably anthracite culm in a finely-divided state, although any suitable waste material may be utilized.

The binder is composed of double silica and lime in about the proportions hereinafter stated. The double silica is a commercial article and comprises three parts concentrated potash silica and two parts concentrated soda silica. The potash silica contains pulverized quartz or sand, (silica,) fifteen parts; pearlash, well pulverized, ten parts; charcoal, powdered, one part. The soda silica contains quartz, one hundred parts; sodic sulfate or anhydrous sodic sulfate, ten parts; charcoal, twenty parts.

The double silica (twenty pounds more or less) and lime (two pounds, more or less) are dissolved in water to make a concentrated solution of about 30° Baumé and may be used singly or in combination with phosphate of aluminium, carbonate phosphate, and sulfate of lead in about equal proportions (as one 35 ounce of each to the quantity of double silica and lime) triturated with said solution.

In making one ton—two thousand pounds—of the composition of matter about ten pounds chlorid of sodium, five pounds of chalk, four 40 pounds fluor-spar, and one-half pound saltpeter are added thereto, the mixture being moistened with the binder of double silica and lime or double silica and lime, phosphate of aluminium, carbonate phosphate, and sulfate of lead and pressed into briquets or other shape. A small quantity of acetate of copper, six to eight ounces, is added to enhance the color of flame.

The fluor-spar mixed with the combustible material (anthracite culm) combines with the double silica and causes the composition to set quickly and dry rapidly without necessitating a kiln or the application of heat. The saltpeter prevents formation of clinkers, whereas the sodium chlorid and acetate of copper promotes the combustive qualities. The saltpeter assists the fused silica to burn to an ash or helps to disintegrate it while the fuel is burning.

Having thus described the invention, what is claimed as new is—

1. A composition of matter for fuel, consisting of combustible material and double silica and lime, in about the proportions set forth.

2. A composition of matter for fuel consisting of combustible material and double silica, lime, phosphate of aluminium, carbonate phosphate and sulfate of lead, in the proportions substantially as specified.

3. A composition of matter for fuel consisting of combustible material, fluor-spar and double silica and lime, in about the proportions described.

4. A composition of matter for fuel, consisting of combustible material, sodium chlorid, chalk and double silica and lime, in the proportions substantially as specified.

5. Artificial fuel consisting of anthracite culm and a binder of double silica and lime, in about the proportions specified.

6. Artificial fuel, consisting of anthracite culm, sodium chlorid, chalk, fluor-spar, saltpeter, acetate of copper, double silica, lime, phosphate of aluminium, carbonate phosphate and sulfate of lead in about the proportions substantially as described.

In testimony whereof I affix my signature in presence of two witnesses.

FRANCIS J. BULASK. [L. S.]

Witnesses:
J. S. WERTMAN,
ELLIS BARTHOLOMEW.